(12) United States Patent
Kim

(10) Patent No.: US 8,466,863 B2
(45) Date of Patent: Jun. 18, 2013

(54) LIQUID CRYSTAL DISPLAY AND METHOD FOR MANUFACTURING THE SAME

(71) Applicant: Samsung Display Co., Ltd., Yongin (KR)

(72) Inventor: Dong-Gyu Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/647,211

(22) Filed: Oct. 8, 2012

(65) Prior Publication Data

US 2013/0029442 A1  Jan. 31, 2013

Related U.S. Application Data

(62) Division of application No. 12/368,787, filed on Feb. 10, 2009, now Pat. No. 8,305,312.

(30) Foreign Application Priority Data

Jul. 2, 2008  (KR) ........................ 10-2008-0063973

(51) Int. Cl.
*G09G 3/36* (2006.01)

(52) U.S. Cl.
USPC .............................................. 345/87; 345/88

(58) Field of Classification Search
None
See application file for complete search history.

(56) References Cited

U.S. PATENT DOCUMENTS

| | | | |
|---|---|---|---|
| 5,419,991 A | 5/1995 | Segawa | |
| 2006/0033871 A1 | 2/2006 | Kim | |

FOREIGN PATENT DOCUMENTS

| | | |
|---|---|---|
| KR | 10-0428484 B1 | 4/2004 |
| KR | 1020040048757 A | 6/2004 |
| KR | 1020040060042 A | 7/2004 |
| KR | 1020050011091 A | 1/2005 |
| KR | 1020070005923 A | 1/2007 |
| KR | 1020070091730 A | 9/2007 |
| KR | 1020070106062 A | 11/2007 |
| KR | 1020070122158 A | 12/2007 |

*Primary Examiner* — Paul Huber
(74) *Attorney, Agent, or Firm* — Innovation Counsel LLP

(57) ABSTRACT

A liquid crystal display includes a substrate and a display region on the substrate. The display region has one or more gate lines; a gate insulating layer; a semiconductor layer; one or more pairs of source and drain electrodes, each pair being one source electrode and one corresponding drain electrode; and one or more data lines, each comprising one or more of the source electrodes. A passivation layer overlies the data lines and the drain electrodes and has a plurality of contact holes; and one or more color filters overlie the passivation layer and have a plurality of through holes. In the display region, in top view, the semiconductor layer has the same shape as the data lines and the drain electrodes except over each region between each source and corresponding drain electrode, and the contact holes' edges are aligned with the through holes' edges.

7 Claims, 15 Drawing Sheets

LIQUID CRYSTAL DISPLAY AND METHOD FOR MANUFACTURING THE SAME

CROSS-REFERENCE TO RELATED APPLICATION

This is a divisional application of U.S. patent application Ser. No. 12/368,787, filed Feb. 10, 2009, which application claims priority to and the benefit of Korean Patent Application No. 10-2008-0063973 filed in the Korean Intellectual Property Office on Jul. 2, 2008, the entire contents of each of which are incorporated herein by their references.

BACKGROUND OF THE INVENTION (a) Field of the Invention

The present invention relates to a liquid crystal display and a manufacturing method thereof.

(b) Description of the Related Art

A liquid crystal display is one of widely used types of flat panel displays. The liquid crystal display includes two display panels containing field generating electrodes such as pixel electrodes and a common electrode. A liquid crystal layer is interposed between the display panels. Voltages are applied to the field generating electrodes to generate an electric field in the liquid crystal layer. The electric field determines the tilt angles of the liquid crystal molecules. The tilt angles control the polarization of incident light so as to form a desired image.

In many liquid crystal displays, the pixel electrodes are located in one of the panels and the common electrode is located in the other panel.

A liquid crystal display may also include color filters made of an organic material containing pigments for color display. If the color filters are located in the different panel than the pixel electrodes, the pixel electrodes may be undesirably misaligned with the color filters. To solve this problem, a color filter on array (CoA) structure has been developed in which the pixel electrodes and the color filters are formed in the same display panel. In addition to the color filters and the pixel electrodes, such display panel contains signal lines (such as gate lines and data lines) used to provide voltages to the pixel electrodes and also contains switching elements for controllably providing these voltages to the pixel electrodes.

Such display panel is formed using a number of thin films including one or more insulating layers, one or more semiconductor layers, and a number of conductive layers for the gate lines and the data lines. These thin films are patterned by photolithographic processes using a number of optical masks. Use of each mask increases the process time and complexity because use of each mask involves photoresist deposition, exposure, developing, and cleaning. Accordingly, it is desirable to reduce the number of masks required.

The above information disclosed in this Background section is only for enhancement of understanding of the background of the invention and may therefore contain information that does not form prior art for this patent application.

SUMMARY

In some embodiments of the present invention, a display panel for a liquid crystal display having a color filter on array structure can be manufactured with a reduced number of masks.

Some embodiments of the present invention provide a liquid crystal display comprising: a substrate; a display region on the substrate, the display region comprising: one or more gate lines overlying the substrate; a gate insulating layer overlying the gate lines; a semiconductor layer overlying the gate insulating layer; one or more pairs of source and drain electrodes overlying the semiconductor layer, each pair being a pair of one source electrode and one corresponding drain electrode facing the source electrode; one or more data lines overlying the semiconductor layer, each data line comprising one or more of the source electrodes, wherein a display area is provided at each intersection of the data lines with the gate lines; a passivation layer overlying the data lines and the drain electrodes and comprising a plurality of contact holes; and one or more color filters overlying the passivation layer and comprising a plurality of through holes, wherein in said display region, in top view, the semiconductor layer has the same shape as the data lines and the drain electrodes except over each region between each source electrode and the corresponding drain electrode, and the contact holes' edges are aligned with the through holes' edges.

In some embodiments, the contact holes comprise: for each drain electrode, a first contact hole exposing an end portion of the drain electrode; and for each data line a second contact hole exposing an end portion of the data line.

In some embodiments, at least one said color filter is present in a region adjacent to the end portion of one of the gate lines and the end portion of one of the data lines, wherein said region does not overlap with any display area.

In some embodiments, said at least one said color filter overlaps the end portions of the one of the gate lines and the one of the data lines.

In some embodiments, said at least one said color filter is a blue color filter.

Some embodiments further comprise at least one data pad formed of the same material as the gate lines and electrically connected to the end portion of at least one of the data lines.

In some embodiments, said at least one said color filter is a blue color filter overlying the data pad.

Some embodiments further comprise a contact member connecting the end portion of at least one of the data lines to the data pad through the second contact hole and the second through hole.

Some embodiments further comprise one or more pixel electrodes, each pixel electrode being present in a respective one of said display areas, wherein each pixel electrode comprises a plurality of minute branches whose edges include edges extending in different (non-parallel) directions.

In some embodiments, each of the edges of the minute branches forms an angle of 45° or 135° with the gate lines.

Some embodiments further comprise a light blocking member and a column spacer which overlie the pixel electrodes.

In some embodiments, the light blocking member and the column spacer are formed of the same material but their top surfaces are at different heights.

In some embodiments, the light blocking member overlies the end portion of each gate line and of each data line.

In some embodiments, the color filters overlie the end portion of each gate line and of each data line.

In some embodiments, each color filter overlying the end portion of at least one gate line and/or at least one data line is a blue color filter.

Some embodiments provide method for manufacturing a liquid crystal display, the method comprising: forming a gate line and a data pad on a substrate; forming a gate insulating layer over the gate line; sequentially depositing, over the gate insulating layer, an intrinsic silicon layer which is amorphous silicon or polysilicon, then a doped amorphous silicon layer, and then a data metal layer; obtaining a pattern for a patterning operation; patterning the intrinsic silicon layer, the doped amorphous silicon layer, and the data metal layer as defined by said pattern, to form a patterned intrinsic silicon layer, an ohmic contact layer, and a data line; depositing a passivation layer over the data line; forming over the passivation layer one or more color filters having a plurality of through holes; etching the passivation layer and the gate insulating layer while using the color filters as a mask; and forming a pixel electrode over the color filters.

Some embodiments further comprise forming over the pixel electrode, from a single layer, a light blocking member and a column spacer.

In some embodiments, the light blocking member overlies the end portion of the data line.

In some embodiments, in the etching of the passivation layer and the gate insulating layer while using the color filters as the mask, the data pad and the end portion of the gate line become exposed.

In some embodiments, in the etching of the passivation layer and the gate insulating layer while using the color filters as the mask, a first contact hole is formed exposing the drain electrode, and a second contact hole is formed exposing the end portion of the data line.

In some embodiments, the forming of the pixel electrode comprises forming a contact liner connecting the data pad to the end portion of the data line through the second contact hole.

In some embodiments, the gate line and the data pad are formed of the same layer.

According to some embodiments of the present invention, the color filters are used to etch the passivation layer as an etch mask such that the liquid crystal display may be manufactured with a reduced number of masks, thereby reducing the manufacturing time and cost.

Figure 1:
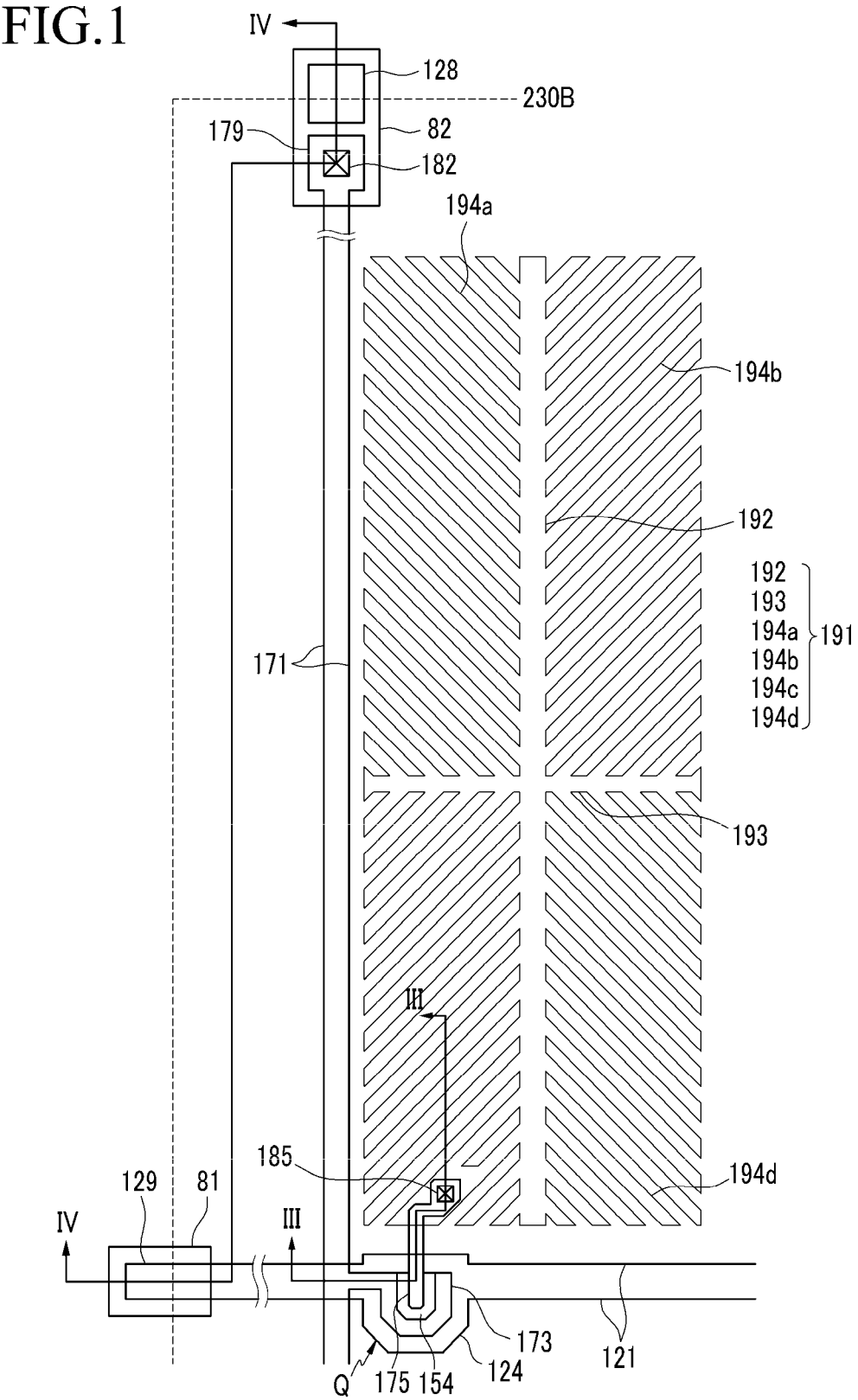
FIG. 1 is a layout view of a liquid crystal display according to an exemplary embodiment of the present invention.

| Description of Some Reference Numerals in the Drawings | |
|---|---|
| 3: | liquid crystal layer |
| 11, 21: | alignment layers |
| 21, 22: | polarizers |
| 30: | liquid crystal molecules |
| 100: | lower panel |
| 110, 210: | substrates |
| 121, 129: | gate lines |
| 124: | gate electrodes |
| 128: | data pads |
| 140: | gate insulating layer |
| 151, 154: | semiconductor elements |
| 161, 163, 165: | ohmic contacts |

| Description of Some Reference Numerals in the Drawings | |
|---|---|
| 171, 179: | data lines |
| 173: | source electrodes |
| 175: | drain electrodes |
| 180: | passivation layer |
| 181, 182, 185: | contact hole |
| 191: | pixel electrodes |
| 220: | light blocking member |
| 230R, 230G, 230B: | color filters |
| 231, 232, 235: | through holes |
| 270: | common electrode |

DETAILED DESCRIPTION OF SOME EMBODIMENTS

Some embodiments of the present invention will now be described with reference to the accompanying drawings. These embodiments are not limiting. The invention is defined by the appended claims.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, then intervening elements may or may not be present. In contrast, when an element is referred to as being "directly on" another element, then there are no intervening elements.

Figure 2:
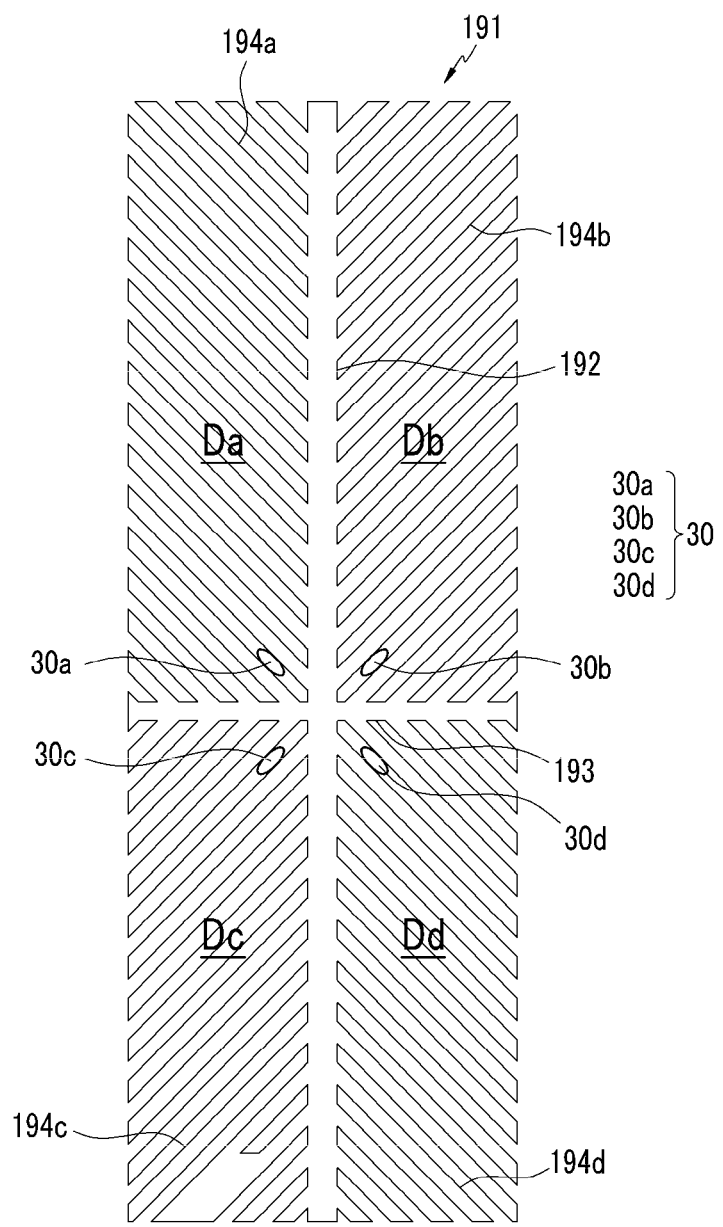
FIG. 2 is a layout view of a pixel electrode in a liquid crystal display according to an exemplary embodiment of the present invention.
Figure 3:
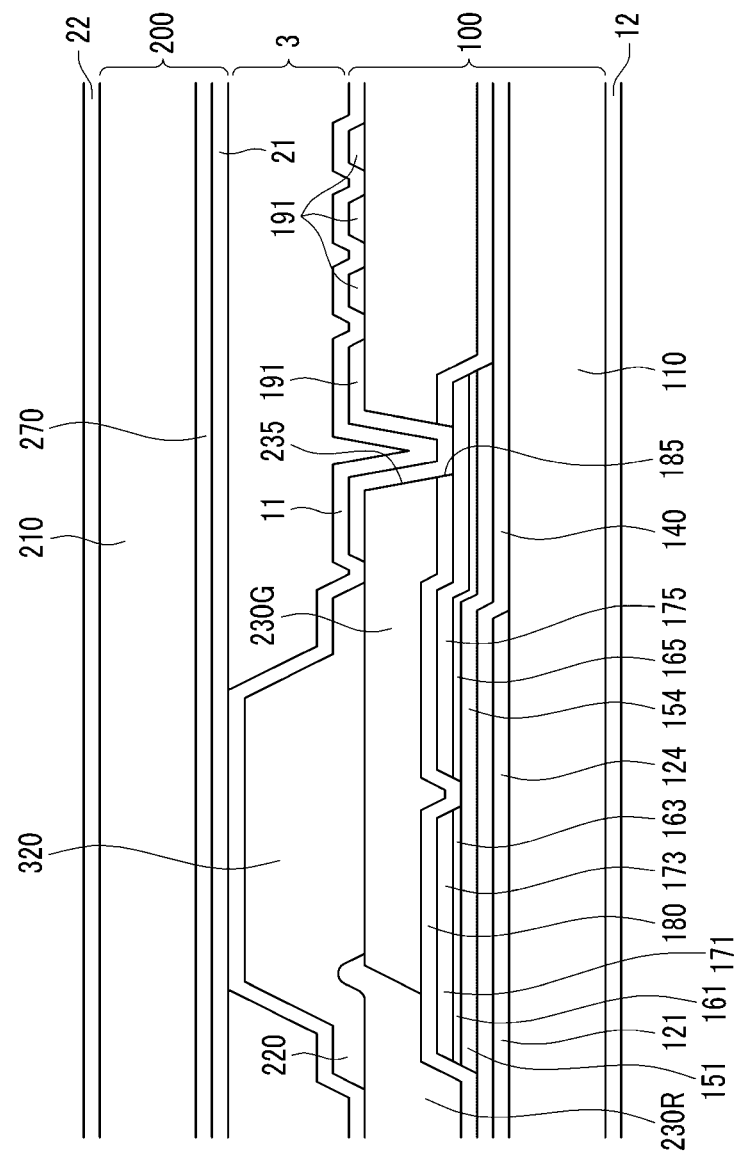
FIG. 3 and FIG. 4 are cross-sectional views of the liquid crystal display shown in FIG. 1 taken along the lines III-III and IV-IV.
Figure 4:
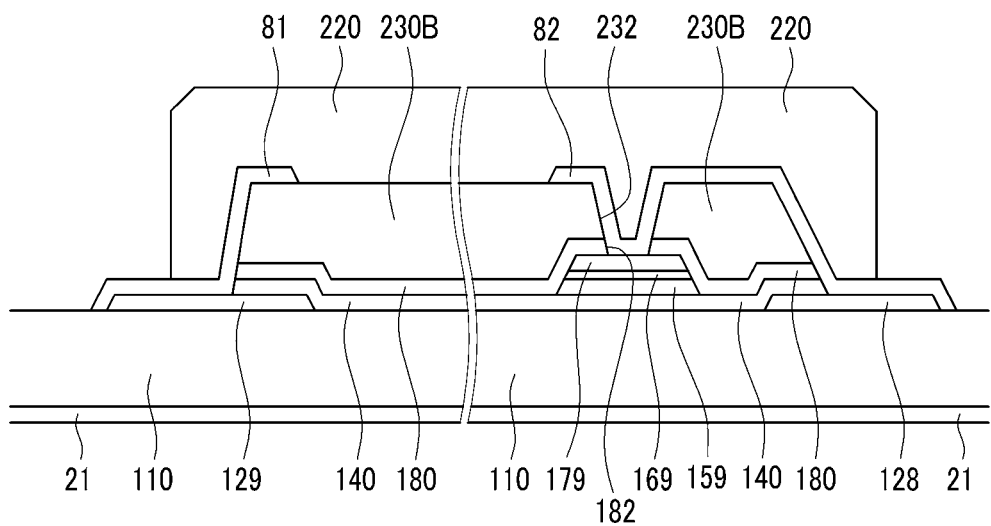

Firstly, a liquid crystal display according to an exemplary embodiment of the present invention will be described with reference to FIGS. 1 to 4. FIG. 1 is a layout view ("top view" herein) of the liquid crystal display. FIG. 2 is a layout view of a pixel electrode in the liquid crystal display. FIGS. 3 and 4 are cross-sectional views of the liquid crystal display shown in FIG. 1 taken along the lines III-III and IV-IV respectively.

Referring to FIGS. 1 to 4, the liquid crystal panel assembly according to this embodiment includes a lower panel 100 and an upper panel 200 facing each other, a liquid crystal layer 3 interposed therebetween, and a pair of polarizers 12 and 22 attached to the outside surfaces of the display panels 100 and 200 respectively.

In the lower panel 100, gate conductors including gate lines 121 and data pads 128 are formed on an insulating substrate 110 that is preferably made of transparent glass or plastic.

The gate lines 121 transmit gate signals and extend horizontally in the view of FIG. 1. Each of the gate lines 121 includes a plurality of gate electrodes 124 protruding upward and downward, and an end portion 129 having a large area for connection with another layer and/or a gate driving circuit.

A gate insulating layer 140, preferably silicon nitride (SiNx) or silicon oxide (SiOx), is formed over the gate lines 121 and the data pads 128.

Semiconductor stripes 151, preferably hydrogenated amorphous silicon or polysilicon, are formed on the gate insulating layer 140. Each of the semiconductor stripes 151 includes a plurality of protrusions 154 and a widened end portion 159.

Ohmic contact stripes 161 and ohmic contact islands 165 are formed on the semiconductor stripes 151. Each of the ohmic contact stripes 161 includes a plurality of protrusions 163 facing the ohmic contact islands 165 above the gate electrodes 124, and has a wide end portion 169 having a large area. The ohmic contacts 161 and 165 may be made of a material such as n+ hydrogenated amorphous silicon heavily doped with an n-type impurity such as phosphorus, or of silicide.

A plurality of data lines 171 and a plurality of drain electrodes 175 are formed on the ohmic contacts 161 and 165 and on the gate insulating layer 140.

The data lines 171 transmit data voltages and extend in the vertical direction in the view of FIG. 1, intersecting the gate lines 121 and defining display areas (pixel areas). Each of the data lines 171 includes a plurality of U-shaped source electrodes 173 and an end portion 179.

The drain electrodes 175 are spaced from the data lines 171. Each drain electrode 175 has one end enclosed by the respective source electrode 173, and has a widened area at the other end.

A gate electrode 124, a source electrode 173, and a drain electrode 175 form a thin film transistor (TFT) along with a protrusion 154 of a semiconductor stripe 151. The thin film transistor's channel is formed in the protrusion 154 of the semiconductor stripe 151 between the respective source electrode 173 and the respective drain electrode 175.

The ohmic contacts 163 and 165 are present only between the underlying semiconductor stripes 151 and the overlying data lines 171 and drain electrodes 175, to reduce contact resistance.

The semiconductor stripes 151 have the same shape in top view (layout view) as the overlying data lines 171 and drain electrodes 175 and the underlying ohmic contacts 161 and 165 except that the semiconductor stripes 151 include portions between the source electrodes 173 and the respective drain electrodes 175.

A passivation layer 180 is formed on the data lines 171, the drain electrodes 175, and the exposed portions of the semiconductor stripes 151. The passivation layer 180 is made of an inorganic insulator such as silicon nitride or silicon oxide.

The passivation layer 180 has a plurality of first contact holes 185 terminating at the widened areas at the ends of the respective drain electrodes 175, and a plurality of second contact holes 182 terminating at the end portions 179 of the respective data lines 171.

The passivation layer 180 and the gate insulating layer 140 are removed over at least parts of the data pads 128 and of the end portions 129 of the gate lines 121 to expose the data pads 128 and the gate lines' end portions 129.

Red, green, and blue color filters 230R, 230G, and 230B are formed on the passivation layer 180. The color filters 230R, 230G, or 230B may be formed as monochromatic bands each of which runs between, and parallel to, a respective pair of adjacent data lines 171. The band may overlap the adjacent data lines. Adjacent monochromatic bands 230R, 230G, 230B overlap with each other. The color filters 230R, 230G, and 230B may be made of a photosensitive organic material containing suitable pigments.

The color filters 230R, 230G, and 230B include first and second through holes 235 and 232 positioned above the respective first and second contact holes 185 and 182 in the passivation layer 180. Each through hole is aligned with the respective contact hole to have substantially the same size, location and shape (when viewed from the top) as the contact hole.

The color filters 230R, 230G, and 230B are present not only in the pixel areas (defined by the intersection of the gate lines 121 and the data lines 171) but also in regions outside the pixel areas, e.g. in regions containing the end portions 129 and 179 of the gate lines and the data lines and extending to the edge of the pixel areas and possibly (but not necessarily) into the pixel areas. In these latter regions, no pixels are present and hence no image is displayed. Therefore, the blue color filters 230B are preferred in these regions because blue is less noticeable (less visible) than red or green. The gate lines' end portions 129 and the data pads 128 are completely covered by the blue filter region or regions 230B except for the second through holes 232 and except for some areas from which the passivation layer 180 and the gate insulating layer 140 are removed.

A plurality of pixel electrodes 191 and a plurality of first and second contact liners 81 and 82 are formed on the passivation layer 180. The first contact liners 81 cover the end portions 129 of the gate lines 121. The second contact liners 82 are connected to the end portions 179 of the data lines 171 through the second contact holes 182, and extend to cover the data pads 128. The first and second contact liners 81 and 82 protect the end portions 129 and 179 and enhance the adhesion of connections of the end portions 129 and 179 to external devices.

Referring to FIG. 2, the overall shape of each pixel electrode 191 is rectangular. Each pixel electrode 191 includes a horizontal (transverse) stem 193, a vertical (longitudinal) stem 192 intersecting the transverse stem 193, and a plurality of first to fourth minute branches 194a, 194b, 194c, and 194d. The pixel electrode 191 is divided into a first sub-region Da, a second sub-region Db, a third sub-region Dc, and a fourth sub-region Dd by the transverse stem 193 and the longitudinal stem 192. The first, second, third, and fourth minute branches 194a, 194b, 194c, and 194d belong respectively to the sub-regions Da, Db, Dc, Dd.

Each first minute branch 194a obliquely extends from the transverse stem 193 or the longitudinal stem 192 in the upper-left direction. Each second minute branch 194b obliquely extends from the transverse stem 193 or the longitudinal stem 192 in the upper-right direction. Each third minute branch 194c obliquely extends from the transverse stem 193 or the longitudinal stem 192 in the lower-left direction. Each fourth minute branch 194d obliquely extends from the transverse stem 193 or the longitudinal stem 192 in the lower-right direction.

Each of the first to fourth minute branches 194a-194d forms an angle of about 45 degrees or 135 degrees with the gate lines 121 or the transverse stem 193. The minute branches 194a-194d of different sub-regions Da-Dd may be perpendicular to each other.

The pixel electrodes 191 are physically and electrically connected to the drain electrodes 175 through the contact holes 185, and receive data voltages from the drain electrodes 175. The pixel electrodes 191 (with their data voltages) and a common electrode 270 of the common electrode panel 200 generate an electric field that determines the orientation of liquid crystal molecules of the liquid crystal layer 3 located between the pixel electrodes 191 and the common electrode 270. The liquid crystal molecules' orientation defines the luminance of the light transmitted through the liquid crystal layer 3.

The edges of the first to fourth minute branches 194a-194d distort the electric field, to provide the electric field with horizontal components that change the tilt angles of the liquid crystal molecules 30. The horizontal components of the electric field are perpendicular to the edges of the first to fourth minute branches 194a-194d. Accordingly, when viewed from the top (as in FIG. 2), the liquid crystal molecules 30a, 30b, 30c, 30d are tilted in the direction parallel to the adjacent minute branches 194a-194d. In the embodiment of FIG. 2, the minute branches 194a-194d of each pixel PX extend in two different mutually-perpendicular directions (upper-left to bottom right and upper-right to bottom-left). Therefore, the liquid crystal molecules 30 tilt in these two directions. The viewing angle of the liquid crystal display is consequently widened.

A light blocking member 220 and column spacers 320 are formed over the pixel electrodes 191. The light blocking member 220 may be referred to as a black matrix, and prevents light leakage between the pixel electrodes 191. The column spacers 320 maintain a gap between the two display panels 100 and 200 to accommodate the liquid crystal layer 3 in this gap. The light blocking member 220 and the column spacers 320 are made of the same photosensitive organic material containing pigments.

An alignment layer 11 is formed over the light blocking member 230 and the column spacers 320.

Now the upper panel 200 will be described. The common electrode 270 preferably consisting of a transparent conductor such as ITO or IZO is formed on the whole surface of a substrate 210. An alignment layer 21 is formed on the common electrode 270.

The two alignment layers 11 and 21 may be vertical alignment layers. The liquid crystal layer 3 between the lower panel 100 and the upper panel 200 includes liquid crystal molecules 30 having negative dielectric anisotropy, and may be oriented such that the major axes of the liquid crystal molecules 30 of the liquid crystal layer 3 are almost perpendicular to the surfaces of the two display panels 100 and 200 when no electric field is applied.

Fabrication of the lower panel of the liquid crystal display shown in FIGS. 1 to 4 will now be described with reference to FIGS. 5 to 14, which show cross-sectional views of the lower liquid crystal display panel 100 at different stages of fabrication. FIGS. 5, 7, 9, 11, 13, and 15 show cross-sections along the line III-III in FIG. 1. FIGS. 6, 8, 10, 12, and 14 show cross-sections along the line IV-IV in FIG. 1.

Figure 5:
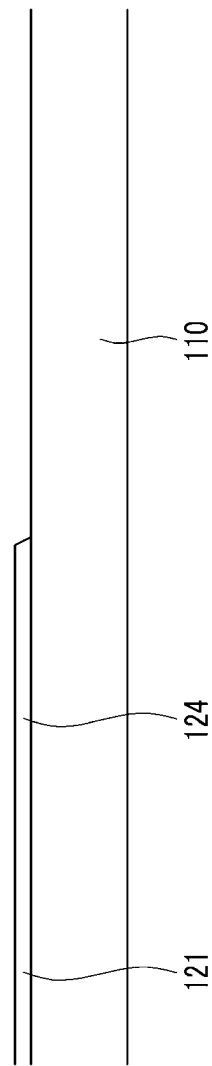
FIG. 5, FIG. 7, FIG. 9, FIG. 11, FIG. 13, and FIG. 15 are cross-sectional views showing the liquid crystal display of FIG. 1 along the line III-III at different stages of fabrication.
Figure 6:
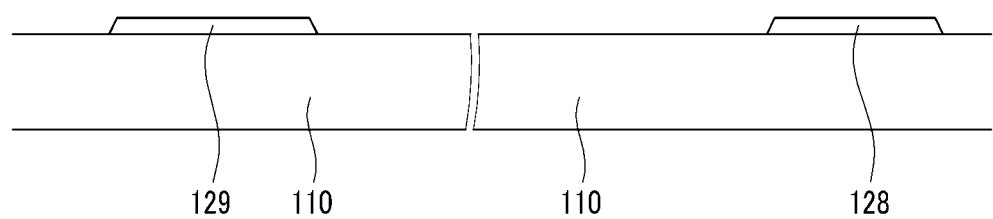
FIG. 6, FIG. 8, FIG. 10, FIG. 12, and FIG. 14 are cross-sectional views showing the liquid crystal display of FIG. 1 along the line IV-IV at different stages of fabrication.

Firstly, as shown in FIGS. 5 and 6, a metal layer made of a material such as molybdenum is deposited on the insulating substrate 110 made of transparent glass or plastic. Next, the metal layer is photolithographically patterned to form the gate lines 121 including the gate electrodes 124 and the end portions 129, and to form the data pads 128.

Figure 7:
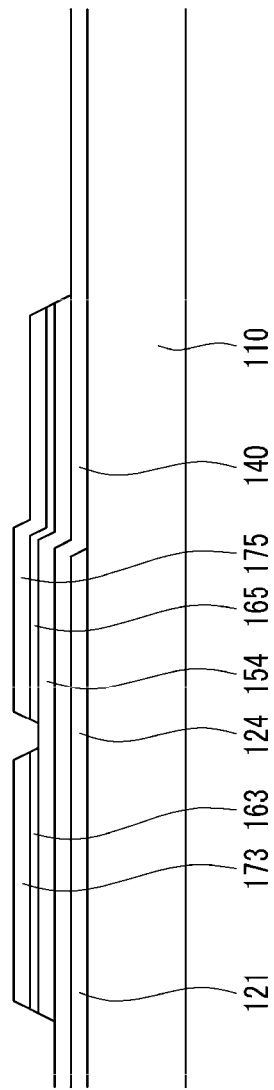
Figure 8:
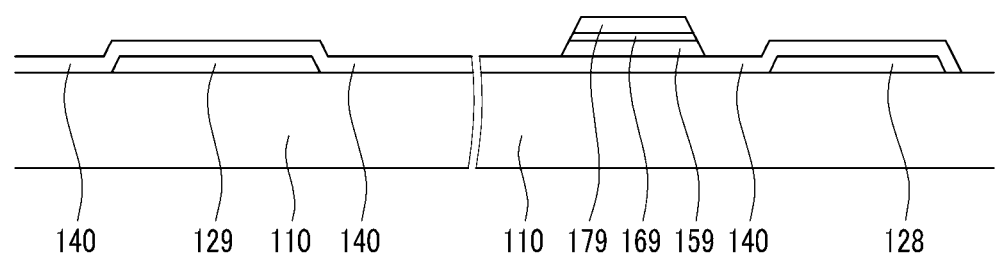

As shown in FIGS. 7 and 8, the gate insulating layer 140 (e.g. silicon nitride (SiNx) or some other suitable material), an intrinsic (undoped) amorphous silicon layer, and an n+ doped amorphous silicon layer 161 are deposited one after another by plasma enhanced chemical vapor deposition (PECVD) over the gate lines 121 and the data pads 128. The intrinsic amorphous silicon layer can for example be hydrogenated amorphous silicon. The n+ doped amorphous silicon layer 161 can be amorphous silicon heavily doped with phosphorus (P). Alternatively, silicide can be used. Next, a "data" layer (or "data metal" layer), e.g. molybdenum, is formed on the doped amorphous silicon layer 161. The intrinsic amorphous silicon layer, the doped amorphous silicon layer 161, and the data layer are then patterned using a single photolithographic step. The data lines 171, the drain electrodes 175, and the semiconductor stripes 151 with protrusions 154 and widened ends 159 are formed as a result. The data lines 171 and the drain electrodes 175 have substantially the same shape in top view as the semiconductor stripes 151.

In this process, the photolithographic step uses a pattern defined by a photoresist layer of non-uniform thickness. The photoresist is thicker over the data lines 171 and drain electrodes 175 than over the channel regions of the thin film transistors. Such photoresist layer may be formed by a number of methods. For example, an optical mask can be used which has clear and opaque areas and in addition has intermediate, "translucent" areas whose light transmittance is lower than for the opaque areas but higher than for the clear areas. The translucent areas can be formed as opaque areas with clear patterns of slits or lattices sized to provide the intermediate light transmittance (intermediate between that of the opaque and clear areas). Alternatively, the translucent areas can be made using a thin film having an intermediate transmittance or thickness. In case of the slit patterns, it is preferable that the slits or the spaces between the slits be narrower than the resolution of the optical system used for the photoresist exposure. Another possible method involves use of a reflowable photoresist. The reflowable photoresist is first patterned using an optical mask with just clear and opaque areas. In this operation, the photoresist is removed from over the channel regions. Then the photoresist is reflowed to cause some of the photoresist to flow into the areas overlying the channel regions.

Figure 9:
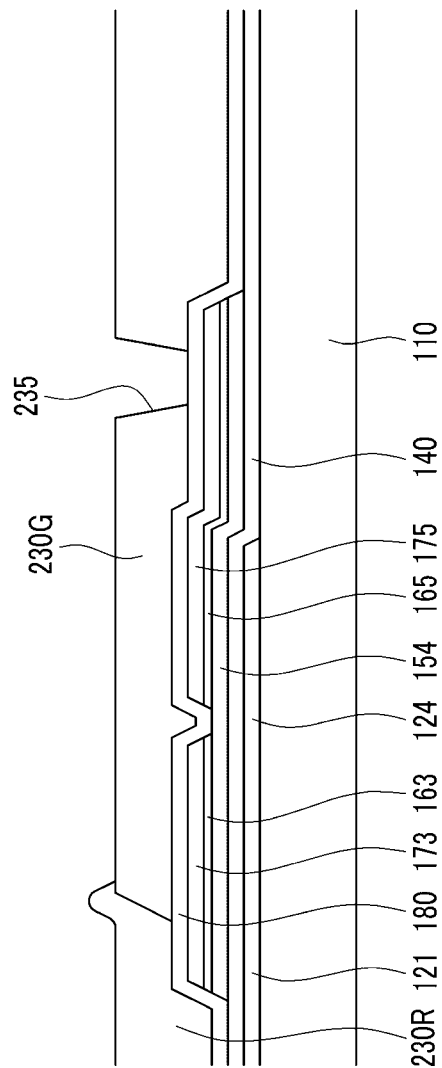
Figure 10:
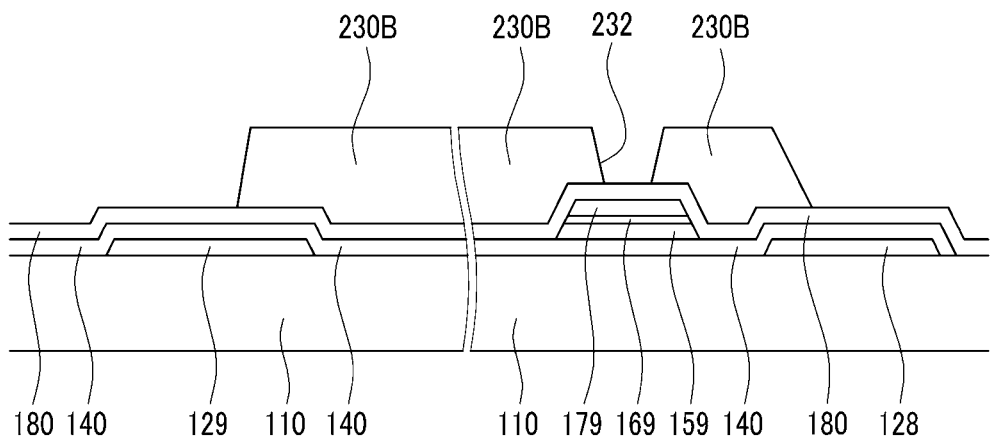

Next, as shown in FIGS. 9 and 10, the passivation layer 180 is formed to cover the protrusions 154 of the semiconductor stripes 151 and also to overlie the data lines 171 and the drain electrodes 175.

Then the color filters 230R, 230G, and 230B are formed on the passivation layer 180 together with the first and second through holes 235 and 232. The passivation layer 180 is exposed over the data pads 128 and the end portions 129.

Figure 11:
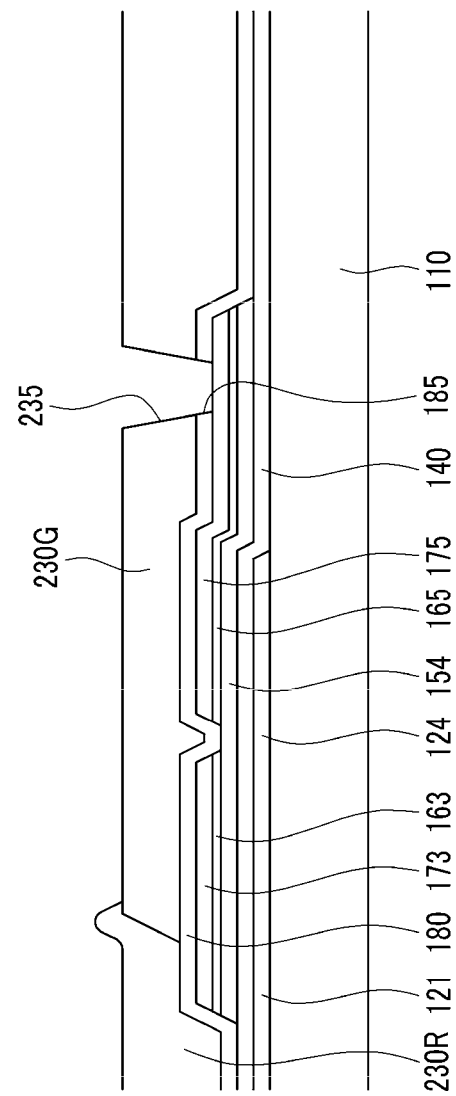
Figure 12:
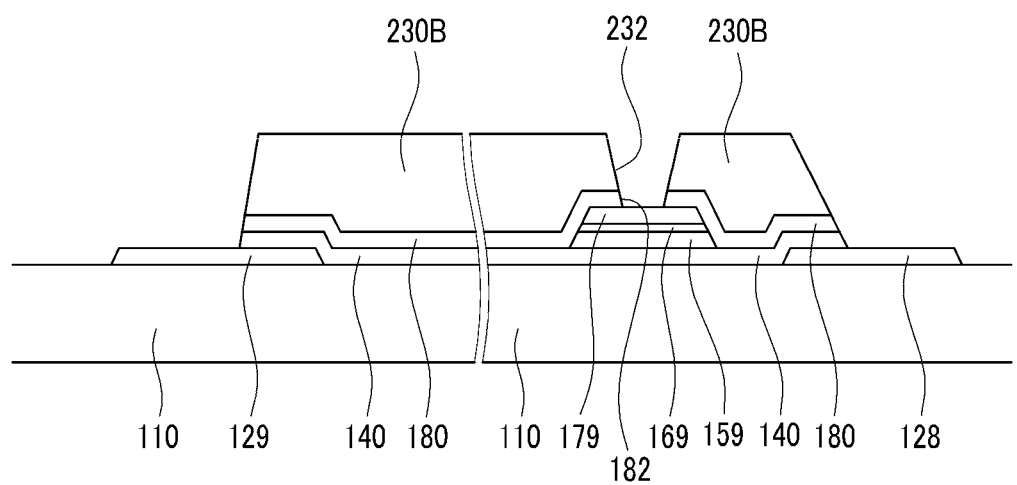

Next, as shown in FIG. 11 and FIG. 12, the passivation layer 180 and the gate insulating layer 140 are dry-etched using the color filters 230R, 230G, and 230B as an etch mask to form the first and second contact holes 185 and 182 and expose the data pads 128 and the gate lines' end portions 129. As a result, the first and second contact holes 185 and 182 are aligned with the respective first and second through holes 235 and 232. Also, the edges of the blue color filters 230B, the gate insulating layer 140, and the passivation layer 180 over the data pads 128 and the gate lines' end portion 129 are aligned with each other.

Figure 13:
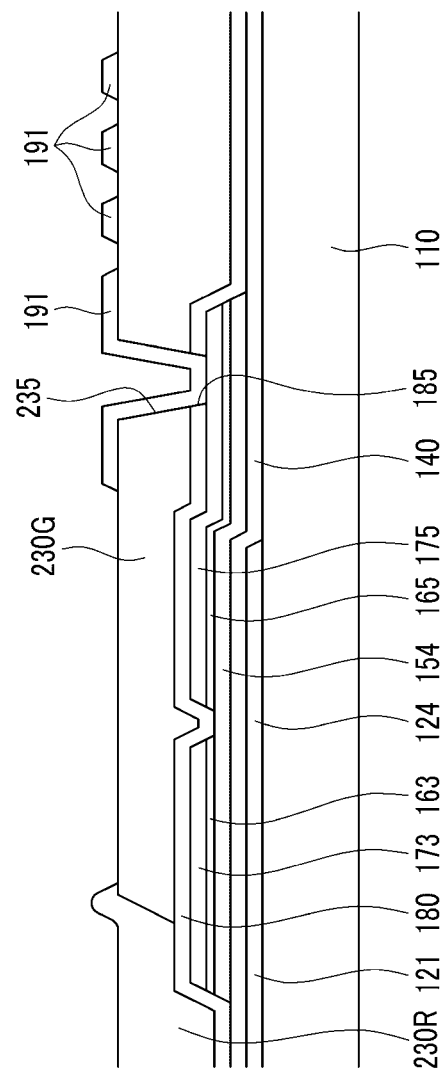
Figure 14:
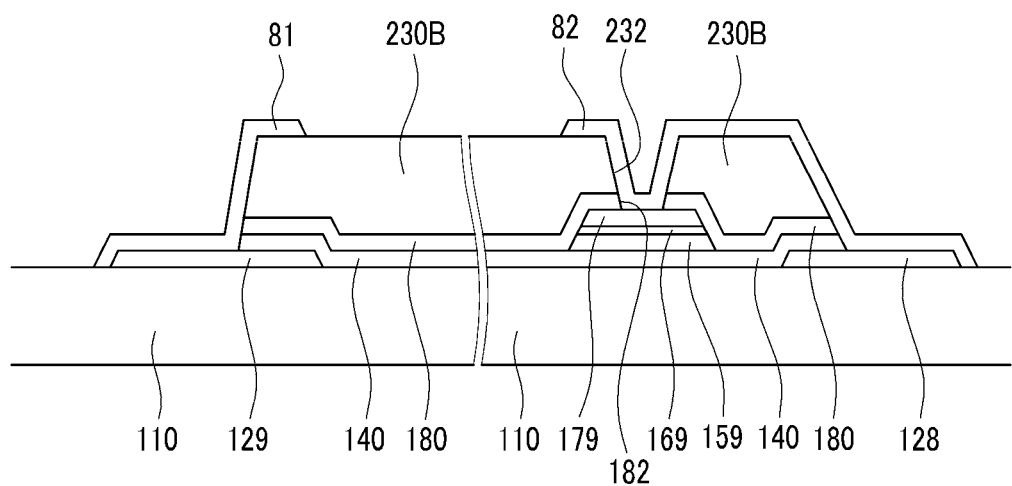

Next, as shown in FIGS. 13 and 14, a transparent conductive material such as ITO or IZO is deposited on the passivation layer 180, and is photolithographically patterned to form the pixel electrodes 191 and the first and second contact liners 81 and 82.

Figure 15:
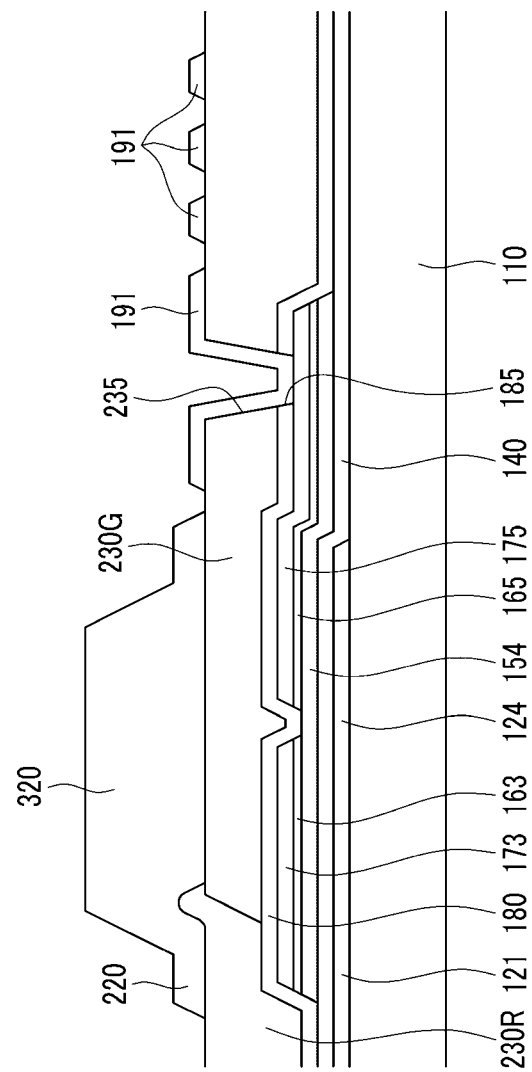

Then, as shown in FIG. 15 and FIG. 4, a photosensitive organic layer with pigments is formed on the color filters 230R, 230G, and 230B and the first and second contact liners 81 and 82, and photolithographically patterned to form the light blocking member 220 and the column spacers 320. In this process, when exposing the photosensitive organic layer, the exposure dose is varied to obtain a desired non-uniform thickness of the photosensitive organic layer as needed to form the light blocking member 220 and the column spacers 320. The light blocking member 220 overlies the first and second contact liners 81 and 82 and protects the gate lines 121 and the data lines 171 from being exposed and thus corroded.

In this manufacturing process, since the color filters 230R, 230G, and 230B of the lower panel 100 are used as an etch mask to etch the passivation layer 180 and the gate insulating layer 140, the thin film transistors and the pixel electrodes may be formed by three masks (not counting the masks used to pattern the color filters 230R, 230G, and 230B and the light blocking member 220).

The embodiments described above illustrate but do not limit the present invention. Other embodiments and variations are within the scope of the invention as defined by the appended claims.

What is claimed is:

1. A method for manufacturing a liquid crystal display, the method comprising:
    forming a gate line and a data pad on a substrate;

forming a gate insulating layer over the gate line;

sequentially depositing, over the gate insulating layer, an intrinsic silicon layer which is amorphous silicon or polysilicon, then a doped amorphous silicon layer, and then a data metal layer;

obtaining a pattern for a patterning operation;

patterning the intrinsic silicon layer, the doped amorphous silicon layer, and the data metal layer as defined by said pattern, to form a patterned intrinsic silicon layer, an ohmic contact layer, and a data line;

depositing a passivation layer over the data line;

forming over the passivation layer one or more color filters having a plurality of through holes;

etching the passivation layer and the gate insulating layer while using the color filters as a mask; and forming a pixel electrode over the color filters.

2. The method of claim 1, further comprising forming over the pixel electrode, from a single layer, a light blocking member and a column spacer.

3. The method of claim 2, wherein the light blocking member overlies the end portion of the data line.

4. The method of claim 1, wherein in the etching of the passivation layer and the gate insulating layer while using the color filters as the mask, the data pad and the end portion of the gate line become exposed.

5. The method of claim 4, wherein in the etching of the passivation layer and the gate insulating layer while using the color filters as the mask, a first contact hole is formed exposing the drain electrode, and a second contact hole is formed exposing the end portion of the data line.

6. The method of claim 5, wherein the forming of the pixel electrode comprises forming a contact liner connecting the data pad to the end portion of the data line through the second contact hole.

7. The method of claim 1, wherein the gate line and the data pad are formed of the same layer.

* * * * *